United States Patent [19]
Weston

[11] Patent Number: 6,007,134
[45] Date of Patent: Dec. 28, 1999

[54] PORTABLE GOLF CART WEATHERSHIELD SYSTEM

[76] Inventor: Alfred G. Weston, 915 N. Michigan Ave., Howell, Mich. 48843

[21] Appl. No.: 09/010,361

[22] Filed: Jan. 21, 1998

[51] Int. Cl.⁶ .......................................................... B60J 9/00
[52] U.S. Cl. ........................................ 296/83; 280/DIG. 5
[58] Field of Search ............................. 296/77.1, 79, 80, 296/83, 96.21, 145; 280/DIG. 5

[56] References Cited

U.S. PATENT DOCUMENTS

| | | | |
|---|---|---|---|
| 695,332 | 3/1902 | Norment | 296/83 |
| 864,952 | 9/1907 | Charles | 296/83 |
| 1,316,834 | 9/1919 | Fahrney | 296/79 X |
| 4,013,315 | 3/1977 | West | 280/DIG. 5 X |
| 4,014,589 | 3/1977 | Yerkey | 280/DIG. 5 X |
| 4,098,536 | 7/1978 | Mills . | |
| 4,773,694 | 9/1988 | Gerber . | |
| 4,830,037 | 5/1989 | Held . | |
| 5,146,967 | 9/1992 | Chapman | 280/DIG. 5 X |
| 5,217,275 | 6/1993 | Ridge . | |
| 5,259,656 | 11/1993 | Carroll . | |
| 5,310,235 | 5/1994 | Seymour et al. . | |
| 5,388,881 | 2/1995 | Spencer et al. . | |
| 5,429,404 | 7/1995 | King, Sr. . | |
| 5,588,690 | 12/1996 | Showalter . | |
| 5,688,018 | 11/1997 | Simpson | 296/77.1 X |
| 5,741,041 | 4/1998 | Sullivan | 296/100 |
| 5,788,317 | 8/1998 | Nation | 280/DIG. 5 X |

*Primary Examiner*—D. Glenn Dayoan
*Assistant Examiner*—Chad D. Wells
*Attorney, Agent, or Firm*—Harness, Dickey & Pierce, P.L.C.

[57] ABSTRACT

A portable golf cart weathershield system including a front windshield portion, a rear windshield portion and a golf club compartment cover. The portable golf cart weathershield system is made of a lightweight, flexible, transparent, water repellent material and may be rolled up to a compact size for storage. The golf cart weathershield system is easily attached to and removed from any golf cart having a roof and requires a minimal number of attaching means.

10 Claims, 3 Drawing Sheets

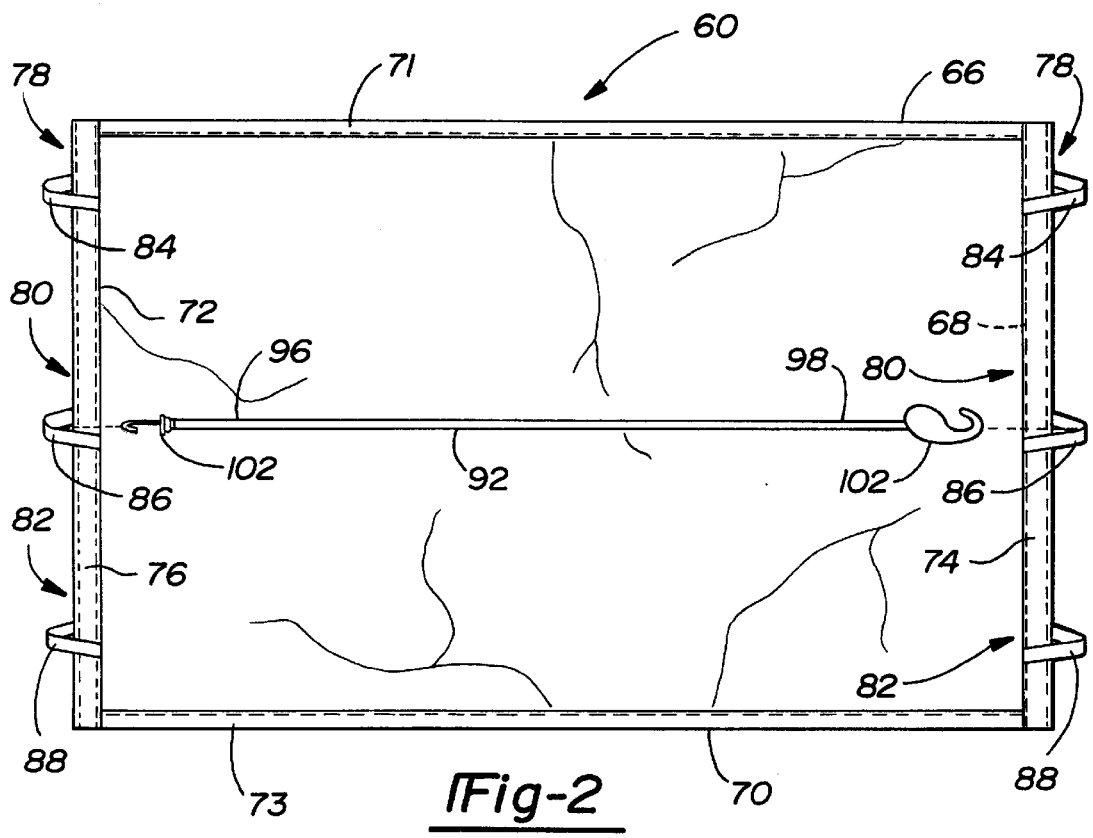
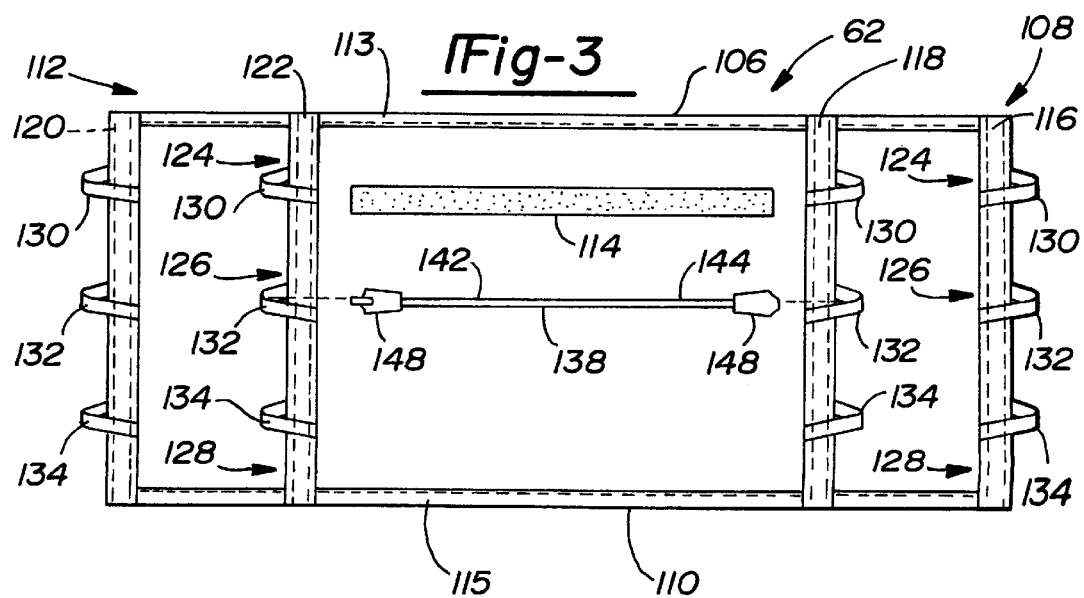

PORTABLE GOLF CART WEATHERSHIELD SYSTEM

BACKGROUND OF THE INVENTION

1. Technical Field

The present invention generally relates to a golf cart weathershield. More particularly, the present invention relates to a lightweight, portable, easy to assemble golfer and golf clubs weathershield system for use on standard golf carts used in the golfing industry.

2. Discussion

Due to the increasing popularity of golf as a year-round sport, much has been done to improve equipment which to a significant degree, is designed for use to protect players against inclement weather conditions. In climates where the weather varies greatly among the seasons of the year, golfing can be made difficult by cold, rainy, windy or other inclement weather conditions.

In the past, the only golf cart covers that were available were sold as accessories to specific golf carts because they had to be made to fit a specific cart and required certain attachment means on the cart, such as snaps. This meant that the golfer had to depend on the golf course to provide a golf cart cover for protection from the elements. Due to the cost and storage inconveniences, golf courses that provide such golf cart covers normally only have a limited supply leaving some golfers out in the cold.

Various types of portable golf cart covers are commercially available. Most previous attempts at providing such a climate-controlled environment for golfers have centered on completely enclosing the golf cart, the golf cart being a means for transportation as well as providing shelter. These covers are typically draped over the entire cart in anticipation of poor weather conditions and are constructed from several panels of a water-repellent material such as flexible plastic, canvas or tarpaulin. These covers also include a transparent plastic material, at least in the front panel for purposes of visibility. The panels may be joined to one another by sewing or with heavy duty zippers. Such covers are usually attached to the cart by means of hooks and/or clips. A zippered or snapped slit in one or both sides of the cover allows the golfer access into and out of the cart.

Although most of the above described covers provide adequate protection from the rain, they have numerous drawbacks. For example, access into and out of the golf cart is made much less convenient because of the continuous need to zip/unzip or snap/unsnap the slit opening in the side. In order to access golf clubs or other items placed in the rear of the golf cart, the back cover of the enclosure must be opened or removed to some extent to allow access therein which results in the enclosed area within the golf cart being exposed to the inclement weather, thereby negating the enclosure's protective effect.

The limitations associated with current golf cart covers further include the fact that canvas and tarpaulin are relatively heavy weight, thick materials which inhibit the folding of a cover constructed of this material to a size which is compact and easy to transport and store. Again, because this material is generally heavy weight, panels must be joined by sewing them together or by sewing in heavy duty zippers or snaps, all of which leads to higher manufacturing costs. Additionally, the stitching may eventually weaken and tear, and the zippers often stick, or are prone to breakage if the golfer does not completely open the zipper before entering or exiting the golf cart. As a result of these disadvantages, the current golf cart covers are preferably removed each time the rain or cold weather conditions subside which is time consuming, cumbersome and unpleasant. Moreover, folding the cover up and onto the roof of the golf cart when not in use tends to give an unsightly appearance.

Yet another disadvantage of the current golf cart covers is that the means for attachment of the cover to the cart can be cumbersome. Typically, the covers are secured by attaching hooks or clips, located along the bottom edge of the cover and permanently affixed thereto, to the underside of the cart. When the cover is attached to the underside of the cart, access to the passenger compartment is often awkward and somewhat limited.

The types of devices as described in the current golf cart cover art are adequate in many respects but in other ways exhibit various disadvantages which leads to the result that few, if any, golfing establishments have provided these curtains, covers and rain guards on their golf carts. Obviously, these types of covers are an additional expense which many clubs do not wish to incur and in many instances their existing carts may not be suitable for application. Therefore, when a golfer is playing on a course which does not provide golf carts equipped for inclement weather, that person is subject to being uncomfortable. Additionally, while a golfer's home course may possibly provide such weatherproof carts, it is quite likely that some golfers will travel on vacation or for business reasons and play on many courses that do not have such accommodations. Accordingly, the need exists to provide an improved, cost effective, portable golf cart weathershield system made of a lightweight, yet durable material, being easily mounted on and attached to any golf cart and rollable to a compact size when not in use. The current invention creates a protective environment for golfers within a golf cart and offers major improvements over previous methods such as maintaining the visibility of the golfers while inside the cart, thus preserving the quality of their golfing experience, while greatly improving the convenience of getting into and out of the golf cart as well as of removing clubs from the cart, if they are stored inside. Additionally, the current invention provides a durable yet easily removable means for quickly attaching or removing from the golf cart. Thus, the current weathershield system provides a comfortable climate within the cart during poor weather conditions, allowing golfers to extend their golfing seasons.

SUMMARY OF THE INVENTION

The present invention is a substantial improvement over the current golf cart cover systems because it provides a golf cart cover that is very lightweight and easy to carry and that does not require any attachment means on the cart itself. This means that golfers can bring a cover with them and put it in the back of the cart whenever and wherever they go golfing. Then, if the weather gets bad, they can simply take the cover out of its storage container, put it on the cart, and keep golfing. They are not dependent upon the golf course supplying covers for their carts, and they do not have to stand in the rain, cold and inclement weather for twenty (20) minutes trying to get a cumbersome, bulky cover installed on their cart.

Thus, it is a purpose of the present invention to overcome the disadvantages of the current golf cart cover art and thereby provide a relatively inexpensive, lightweight, portable golf cart cover.

It is a principal object of the present invention to provide a golf cart weathershield system for the creation and maintenance of a pleasant climate within a golf cart during poor weather conditions and which allows for carefree ingress and egress with respect to the golf cart without having to first open a door to the golf cart.

A related object of the present invention is to provide a golf cart weathershield system which is easily removable and may be used on a variety of existing carts without modification to the cart.

It is another object of the present invention to provide a golf cart weathershield system which is cost effective and made of a lightweight material, and when not in use, may be compactly rolled up and packed into a container for storage.

A related object of the present invention is to provide a golf cart weathershield system which is transparent to enable optimum visibility, acting as a windshield.

It is still yet another object of the present invention to provide a golf cart weathershield system which requires a minimum number of attachment means, thereby enabling easy access to the passenger compartment and golf club compartment areas of the golf cart. In addition, because of the few attachments required, the time to secure the cover to the cart is less than required for existing covers.

It is another object of the present invention to provide a golf cart weathershield system which allows golfers to be isolated from the inclement weather and at the same time allows for golf clubs to be easily accessible without subjecting golfers inside the golf cart weathershield system to be exposed to the inclement weather conditions.

In one form, the present invention provides the art with a golf cart weathershield system made from a flexible, water repellent material including front and rear windshield portions, and a golf club compartment cover. The front and rear windshield portions are removably attached to the golf cart. The golf club compartment cover is removably attached to the rear windshield portion.

Additional benefits, along with other advantages and objects of the present invention will become apparent to those skilled in the art from a reading of the subsequent detailed description, appended claims and accompanying drawings.

BRIEF DESCRIPTION OF THE DRAWINGS

In the drawings which illustrate the best mode presently contemplated for carrying out the present invention:

FIG. 2 is a front view of the front windshield portion of the golf cart weathershield system shown in FIG. 1;

FIG. 3 is a front view of the rear windshield portion of the golf cart weathershield system shown in FIG. 1;

DETAILED DESCRIPTION OF THE PREFERRED EMBODIMENT

Figures 1, 5, 6:
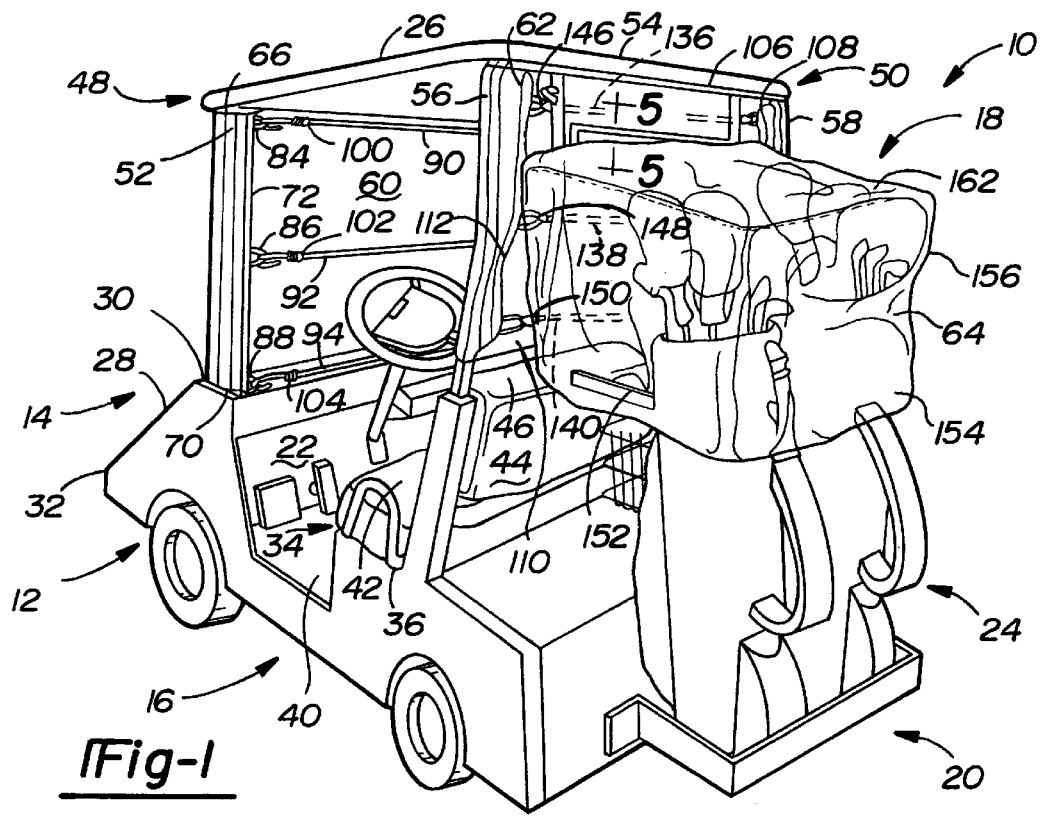
FIG. 1 is a rear perspective view of a golf cart with the weathershield system of the present invention in place.
FIG. 5 is a cross-sectional view taken along the line 5—5 of FIG. 1.
FIG. 6 is a perspective view of the golf cart weathershield system in its rolled up, self-contained storage container state.

Referring now to the drawings in which like reference numerals designate like or corresponding parts throughout the several views, there is shown in FIG. 1 a golf cart weathershield system in accordance with the present invention and which is designated generally by the reference numeral 10. As shown in FIG. 1, the golf cart weathershield system 10 is illustrated as used on a golf cart 12. The golf cart 12 is a conventional model golf cart including a front portion 14, side portions 16 and 18, a rear portion 20, a passenger compartment 22, a golf club compartment 24 and a fixed position sunroof or canopy 26. The front portion 14 of the golf cart 12 has a hood section 28. The hood section 28 of the front portion 14 of the golf cart 12 is generally, substantially vertically inclined having an upper edge 30 and a forward edge 32. The passenger compartment 22 of the golf cart 12 has a seating area 34, hand grips 36 and a foot rest area 40. The seating area 36 includes a seat portion 42 and a back support portion 44 perpendicular thereto. The back support portion 44 of the seating area 34 has a top surface 46 which is generally, substantially perpendicular to the back support portion 44. The fixed position sunroof or canopy 26 is generally rectangular in shape having a front portion 48 and a rear portion 50. The front portion 48 of the fixed position sunroof or canopy 26 is supported by front supporting posts 52 and 54, while the rear portion 50 of the fixed position sunroof or canopy 26 is supported by rear supporting posts 56 and 58.

As shown in FIG. 1, and more specifically in FIGS. 2, 3, 4 and 5, the golf cart weathershield system 10 includes a front windshield portion 60, a rear windshield portion 62 and a golf club compartment cover 64. The materials utilized for the front windshield portion 60, the rear windshield portion 62 and the golf club compartment cover 64 of the golf cart windshield system 10 are relatively thin and lightweight. Generally the material is constructed from a flat sheet of material such as plastic, or other suitable materials, all of which are essentially weather and water repellent. At least the front windshield portion 60 of the golf cart weathershield system 10 is generally constructed of a transparent plastic material for visibility. However, the rear windshield portion 62 and the golf club compartment cover 64 of the golf cart weathershield system 10 may also be constructed of a transparent plastic material for all around visibility. Such transparent materials are not limited to those which are perfectly clear, but include any material which allows visibility from the inside of the golf cart to the outside. Such a flexible, tough, transparent plastic material is substantially less expensive than the use of a canvas or tarpaulin material. Additionally, the use of such a flexible, tough, transparent plastic material is particularly advantageous because they are less likely to develop mold than are the canvas and tarpaulin materials which are typically utilized for golf cart covers. Generally, the material used for the front windshield portion 60, the rear windshield portion 62 and the golf club compartment cover 64 of the golf cart weathershield system 10 should also be sufficiently flexible to enable the golf cart weathershield system 10 to be rolled up to a compact size and shape so that it can be easily stored when not in use. Thus, in a preferred embodiment of the invention, the golf cart weathershield system 10 is made from a 20 mil. thick vinyl weighing not more than 5 pounds. Even more preferably, the golf cart weathershield system 10 is made of a 20 mil. thick vinyl, having a total weight of not more than 5 pounds, which can be rolled up and combined to fit in a storage container with dimensions 6×39 inches.

Referring now to FIG. 2, the front windshield portion 60 of the golf cart weathershield system 10 is illustrated. The front windshield portion 60 is generally rectangular in shape having a top edge 66, a right side portion 68, a bottom edge 70 and a left side portion 72. The top edge 66 and the bottom edge 70 of the front windshield portion 60 includes reinforced binders 71 and 73, respectively. The right side portion 68 of the front windshield portion 60 includes a reinforced binder 74, while the left side portion 72 of the front windshield portion 60 includes a reinforced binder 76. Reinforced binders 71 and 73 run horizontally, substantially along the entire length of the top edge 66 and the bottom edge 70 of the front windshield portion 60, respectively. Reinforced binders 74 and 76 run vertically, substantially along the entire length of the right side portion 68 and the left side portion 72 of the front windshield portion 60, respectively. The reinforced binders 71, 73, 74 and 76 are sewn in place on the front windshield portion 60 or attached by any other suitable attachment means. The reinforced binders 74 and 76 include an upper portion 78, a middle portion 80 and a lower portion 82. Located at the upper portion 78, the middle portion 80 and the lower portion 82 of the reinforced binders 74 and 76 are loops 84, 86 and 88, respectively. Loops 84, 86 and 88 are sewn in place or attached to reinforced binders 74 and 76 by any other suitable attachment means.

Referring now to FIG. 1 and FIG. 2, the front windshield portion 60 of the golf cart weathershield system 10 is shown in place on the golf cart 12. The front windshield portion 60 substantially fills the space created and defined by the front portion 48 of the fixed position sunroof or canopy 26, the front supporting post 52, the upper edge 30 of the hood section 28, and the front supporting post 54. Accordingly, the top edge 66 of the front windshield portion 60 is in close proximity to the front portion 48 of the fixed position sunroof or canopy 26 while the bottom edge 70 of the front windshield portion 60 is in close proximity to the upper edge 30 of the hood section 28. The right side edge 68 of the front windshield portion 60 is wrapped substantially around the front supporting post 54, while the left side edge 72 of the front windshield portion 60 is wrapped substantially around the front supporting post 52 such that, while in place, loops 84, 86 and 88 of the reinforced binders 74 and 76 face inward toward each other. A thin strip of flexible material is utilized to hold the front windshield portion 60 of the golf cart weathershield system 10 in place on the golf cart 12. Bungee cords are desirable for this purpose because of their sufficient flexibility. Thus, Bungee cords 90, 92, and 94 are used for this purpose and illustrated accordingly. Bungee cords 90, 92 and 94 each have a first end 96 and a second end 98. Attached to the first end 96 and the second end 98 of Bungee cords 90, 92 and 94 are hooks 100, 102 and 104, respectively. Hooks 100, 102 and 104 may consist of any suitable hooking devices. Hooks 100, 102 and 104 are attached to the first end 96 and the second end 98 of Bungee cords 90, 92 and 94 by any suitable attachment means. In place, hooks 100, 102, and 104 engage and are interconnected with loops 84, 86 and 88, respectively such that Bungee cords 90, 92 and 94 longitudinally traverse the front windshield portion 60. Thus, as a result of this loop and hook attachment construction, the front windshield portion 60 of the golf cart weathershield system 10 is easily secured tautly in place, thereby preventing the front windshield portion 60 from blowing away or disengaging from the golf cart 12 as a result of heavy wind gusts.

Referring now to FIG. 3, the rear windshield portion 62 of the golf cart weathershield system 10 is illustrated. Again, the rear windshield portion 62 of the golf cart weathershield system 10 is substantially rectangular in shape having a top edge 106, a right side portion 108, a bottom edge 110 and a left side portion 112. Just below the top edge 106 of the rear windshield portion 62 is a VELCRO hook and loop-type fastener strip 114. The VELCRO hook and loop-type fastener strip 114 includes minute loops or hooks on its surface and is attached to the rear windshield portion 62 of the golf cart weathershield system 10 by any suitable attachment means. The top edge 106 and the bottom edge 110 of the rear windshield portion 62 includes reinforced binders 113 and 115, respectively. Reinforced binders 113 and 115 run horizontally, substantially along the entire length of the top edge 106 and the bottom edge 110 of the rear windshield portion 62 and are sewn in place or attached thereto by any other suitable attachment means. The rear windshield portion 62 of the golf cart weathershield system 10 also includes reinforced binders 116, 118, 120 and 122. Reinforced binders 116 and 118 are located on the right side portion 108 of the rear windshield portion 62 and are sewn in place or attached thereto by any other suitable attachment means. The reinforced binders 120 and 122 are located on the left side portion 112 of the rear windshield portion 62 and are sewn in place or attached thereto by any other suitable attachment means. Reinforced binders 116, 118, 120 and 122 run vertically, substantially along the entire length of the right side portion 108 and the left side portion 112 of the rear windshield portion 62, respectively. Each of the reinforced binders 116, 118, 120 and 122 have an upper portion 124, a middle portion 126 and a lower portion 128. The double set of reinforced binders 116 and 118 located on the right side portion 108 and the double set of reinforced binders 120 and 122 located on the left side portion 112 of the rear windshield portion 62 allow for easy adjustability on various sizes of golf carts. Located on the upper portion 124, the middle portion 126 and the lower portion 128 of the reinforced binders 116, 118, 120 and 122 are loops 130, 132 and 134, respectively. Loops 130, 132 and 134 are sewn in place or attached to reinforced binders 116, 118, 120 and 122 by any other suitable attachment means.

Referring again to FIG. 1 and FIG. 3, the rear windshield portion 62 of the golf cart weathershield system 10 is illustrated in place on the golf cart 12. The rear windshield portion 62 substantially fills the space created and defined by the rear portion 50 of the fixed position sunroof or canopy 26, the rear supporting post 56, the top surface 46 of the back support portion 44, and the rear supporting post 58. Accordingly, the top edge 106 of the rear windshield portion 62 is in close proximity to the rear portion 50 of the fixed position sunroof or canopy 26 while the bottom edge 110 of the rear windshield portion 62 is in close proximity to the top surface 46 of the back support portion 44. Again, as with the front windshield portion 60, the right side portion 108 of the rear windshield portion 62 is substantially wrapped around the rear supporting post 58, while the left side portion 112 of the rear windshield portion 62 is wrapped substantially around the rear supporting post 56 such that, while in place, loops 130, 132 and 134 of the reinforced binders 116, 118, 120 and 122 face inward toward each other. Again, a thin strip of flexible material is utilized to hold the rear windshield portion 62 of the golf cart weathershield system 10 in place on the golf cart 12. Bungee cords again are desirable for this purpose because of their sufficient flexibility. Thus, Bungee cords 136,138 and 140 are used for this purpose and illustrated accordingly. Bungee cords 136, 138 and 140 each have a first end 142 and a second end 144. Attached to the first end 142 and the second end 144 of Bungee cords 136, 138 and 140 are hooks 146, 148 and 150, respectively. Hooks 146, 148 and 150 may consist of any suitable hooking devices. Hooks 146,148 and 150 are attached to the first end 142 and the second end 144 of Bungee cords 136, 138 and 140 by any suitable attachment means. Similar to the front windshield portion 60, in place, hooks 146, 148 and 150 engage and are interconnected with loops 130, 132 and 134, respectively, such that the Bungee cords 136, 138 and 140 longitudinally traverse the rear windshield portion 62 Thus, as a result of this loop and hook attachment construction, the rear windshield portion 62 of the golf cart weathershield system 10 is easily secured tautly in place, thereby preventing the rear windshield portion 62 from blowing away or disengaging from the golf cart 12 as a result of heavy wind gusts.

Figure 4:
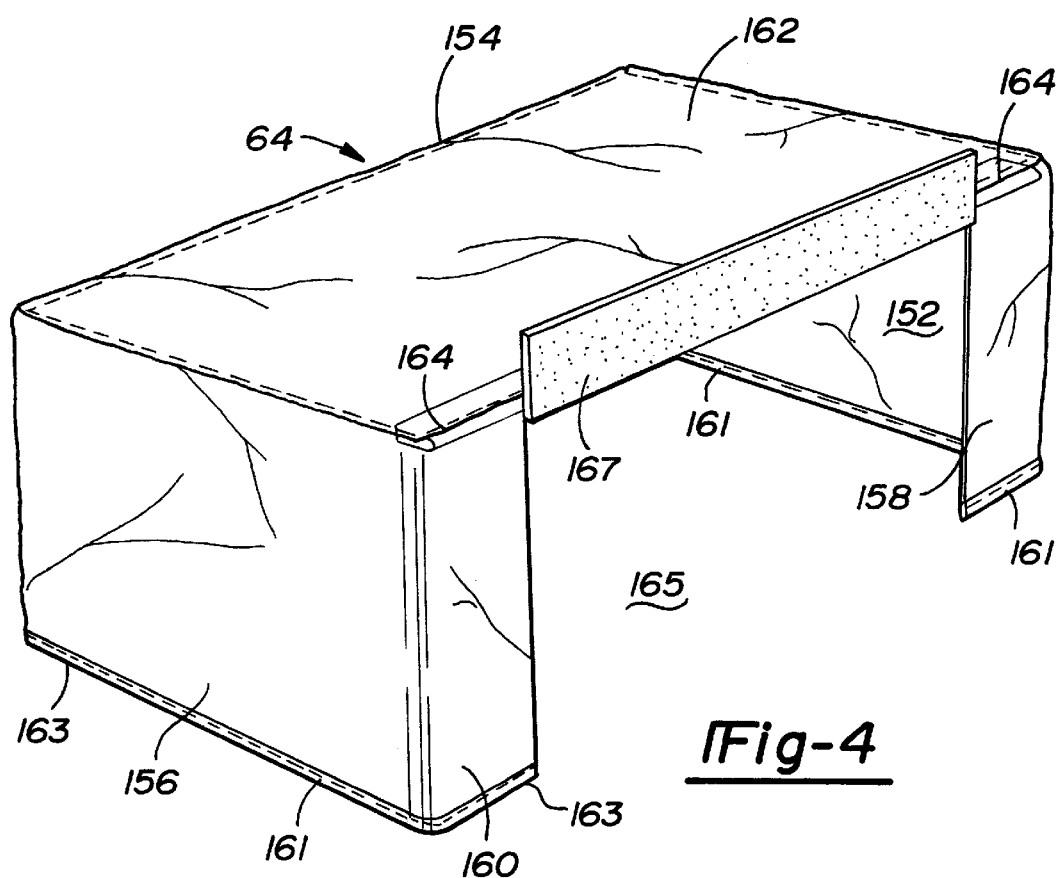
FIG. 4 is a perspective view of the golf club compartment cover portion of the golf cart weathershield system shown in FIG. 1.

Referring now to FIG. 1, FIG. 4 and FIG. 5, the golf club compartment cover 64 of the golf cart weathershield system 10 is illustrated. The golf club compartment cover 64 of the golf cart weathershield system 10 includes a first side 152, a front side 154, a second side 156, a first rear side 158, a second rear side 160 and a top portion 162. Sides 152, 154, 156, 158, 160 and the top portion 162 are generally box like in shape and interconnected to one another by any suitable connection means. A reinforced binder 161 runs substantially along a bottom edge 163 of the golf club compartment cover 64. The reinforced binder 161 is sewn in place on the golf club compartment cover 64 or attached thereto by any other suitable attachment means. A top rear edge 164 runs between, joins and is connected to the first rear side 158 and the second rear side 160. The first rear side 158 and the second rear side 160 are thereby separated by the top rear edge 164 and a space 165. The length of sides 152, 154, 156, 158 and 160 cover and allow for the protection of the golf clubs during inclement weather. The top rear edge 164 includes a VELCRO hook and loop-type fastener strip 167 having minute loops or hooks on its surface. The VELCRO hook and loop-type fastener strip 167 is attached to the top rear edge 164 by any suitable attachment means. The VELCRO hook loop-type fastener strip 167 thereby is capable of cooperating and mating with the strip 114 on the rear windshield portion 62 having the other of either minute loops or hooks on its surface as illustrated in FIG. 5. Accordingly, the rear windshield portion 62 covers and compensates for the space 165 between the first rear side 158 and the second rear side 160 of the golf club compartment cover 64.

The golf club compartment cover 64 of the golf cart weathershield system 10 is easily raised and lowered to allow for easy access to the golf clubs when needed. Furthermore, during weather conditions where precipitation is not a concern, the golf club compartment cover 64 may not need to be required and may be removed.

Referring now to FIG. 6, when each of the front windshield portion 60, the rear windshield portion 62, and the golf club compartment cover 64 of the golf cart windshield system 10 is not in use, it is removed from the golf cart 12, permitted to dry, and rolled up for storage in a simple carrying container 168. The carrying container 168 includes a top cap portion 170, a lower portion 172 and a closure means 174. Because of the flexibility of the material and its overall configuration, the front windshield portion 60, the rear windshield portion 62 and the golf club compartment cover 64 may be easily and compactly rolled up for storage. Therefore, a golfing establishment can keep the golf cart weathershield system 10 on hand for use as desired with much less expense than would be necessary to equip existing carts with permanent shields. The carrying container 168, used for storing the golf cart weathershield system 10, is compact and easily stored on shelves with little space required. Additionally, individuals may desire to purchase and carry in their golf bag the golf cart weathershield system 10 to various courses for utilization during inclement weather conditions. If the weather appears unpredictable, the carrying container 168 containing the golf cart weathershield system 10 may be placed in the golf cart 12 or the golfer's golf bag prior to teeing off until needed.

While the above detailed description describes the preferred embodiment of the present invention, it should be understood that the present invention is susceptible to modification, variation and alteration without deviating from the scope and fair meaning of the subjoined claims.

What is claimed is:

1. A golf cart weathershield system for use on a golf cart having a roof, front roof supports, rear roof supports, open sides, and a passenger compartment used to transport passengers and their equipment around a golf course, said golf cart weathershield system comprising:

a first panel removably attachable to the golf cart to provide a front windshield portion, said first panel including a plurality of loops attached to opposite side edges of said first panel;

a second panel removably attachable to the golf cart to provide a rear windshield portion, said second panel including a plurality of loops attached to opposite side edges of said second panel, said second panel further including a first hook and loop-type strip of fastening material; and a plurality of elongated flexible members each having a first hook attached to a first end and a second hook attached to a second end, wherein said first and second hooks are operable to engage and interconnect with opposing loops on opposite side edges of said first and second panels for removably securing the first panel to the front rod supports and for removably securing said second panel to the rear rod supports;

a third panel defining a golf club compartment cover, said third panel including a second hook and loop-type strip of fastening material to mate with said first hook and loop-type strip of fastener material such that said third panel is removably attached to said second panel, said third panel extending rearwardly such that said second panel is operatively disposed between said first and third panels.

2. A golf cart weathershield system according to claim 1 wherein said panels comprise sheets of flexible, water repellent material.

3. A golf cart weathershield system according to claim 2 wherein said first panel is transparent.

4. A golf cart weathershield system according to claim 1 wherein said first panel, said second panel and said third panel may be compactly rolled up to fit into a carrying container.

5. A golf cart of the type having a roof, front roof supports, rear roof supports, open sides, a passenger compartment used to transport passengers and a golf club compartment used to transport equipment around a golf course, the improvement comprising:

a front windshield portion;

means for removably attaching said front windshield portion to the front roof supports;

a rear windshield portion, said rear windshield portion including a first hook and loop-type strip of fastening material;

means for removably attaching said rear windshield portion to the rear roof supports; and a golf club compartment cover, said golf club compartment cover including a second hook and loop-type strip of fastener material to mate with said first hook and loop-type strip of fastener material such that said golf compartment cover is removably attached to said rear windshield portion.

6. A golf cart according to claim 5 wherein said front windshield portion, said rear windshield portion and said golf club compartment cover comprise sheets of flexible, water repellent material.

7. A golf cart according to claim 5 wherein said front windshield portion, said rear windshield portion and said golf club compartment cover may be compactly rolled up to fit into a carrying container.

8. A golf cart according to claim 5 wherein said means for removably attaching said front windshield portion to the front roof supports include:

a plurality of loops; and at least one strip of flexible material having a first hook attached to a first end and a second hook attached to a second end, wherein said first hook and said second hook are operable to engage and interconnect with said plurality of loops.

9. A golf cart according to claim 8 wherein said means for removably attaching said rear windshield portion to the rear roof supports include:

a plurality of loops; and at least one strip of flexible material having a first hook attached to a first end and a second hook attached to a second end, wherein said first hook and said second hook are operable to engage and interconnect with said plurality of loops.

10. A golf cart according to claim 9 wherein said golf club compartment cover is of sufficient size to cover at least one set of golf clubs.

* * * * *